United States Patent
Ahn et al.

(10) Patent No.: US 11,743,829 B2
(45) Date of Patent: *Aug. 29, 2023

(54) METHOD AND APPARATUS FOR REDUCING POWER CONSUMPTION IN MOBILE DEVICE

(71) Applicant: SAMSUNG ELECTRONICS CO., LTD., Suwon-si (KR)

(72) Inventors: Byeong Do Ahn, Suwon-si (KR); Sung Min Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,824

(22) Filed: Jan. 3, 2023

(65) Prior Publication Data

US 2023/0156605 A1  May 18, 2023

Related U.S. Application Data

(63) Continuation of application No. 17/105,379, filed on Nov. 25, 2020, now Pat. No. 11,564,171, which is a
(Continued)

(30) Foreign Application Priority Data

Sep. 29, 2010 (KR) .................. 10-2010-0094432

(51) Int. Cl.
*H04M 1/00* (2006.01)
*H04W 52/02* (2009.01)

(52) U.S. Cl.
CPC ...... *H04W 52/027* (2013.01); *H04W 52/0283* (2013.01); *Y02D 30/70* (2020.08)

(58) Field of Classification Search
CPC . H04W 52/027; H04W 52/028; H04W 52/02; H04B 1/1615

See application file for complete search history.

(56) References Cited

U.S. PATENT DOCUMENTS 6,901,338 B2  5/2005  Ching
7,239,742 B2  7/2007  Ohtani et al.
(Continued)

FOREIGN PATENT DOCUMENTS

KR  10-2008-0025951  3/2008
KR  10-2010-0050180  5/2010

OTHER PUBLICATIONS

Ahn et al., U.S. Appl. No. 13/247,278, filed Sep. 28, 2011; U.S. Pat. No. 9,743,358.
(Continued)

*Primary Examiner* — Shantell L Heiber
(74) *Attorney, Agent, or Firm* — Nixon & Vanderhye, P.C.

(57) ABSTRACT

A method and apparatus capable of minimizing power consumption occurring when a mobile device is changed from a sleep state to a wake-up state by partially controlling on/off of a display unit and partial booting control of a system function are provided. The method includes detecting a change of the mobile device from a sleep state to a wake-up state, turning on a display unit of the mobile device such that a first section of the mobile device displays an operating region, the first section including one or more portions of the display unit and less than an entire screen of the display unit and waiting for a system function registered in the operating region.

10 Claims, 3 Drawing Sheets

Related U.S. Application Data continuation of application No. 16/849,625, filed on Apr. 15, 2020, now Pat. No. 10,959,179, which is a continuation of application No. 16/298,371, filed on Mar. 11, 2019, now Pat. No. 10,631,247, which is a continuation of application No. 15/642,057, filed on Jul. 5, 2017, now Pat. No. 10,231,186, which is a continuation of application No. 13/247,278, filed on Sep. 28, 2011, now Pat. No. 9,743,358.

(56) References Cited

U.S. PATENT DOCUMENTS

| | | |
|---|---|---|
| 7,415,293 B1 | 8/2008 | Lee |
| 8,152,308 B2 | 4/2012 | Ahn et al. |
| 8,437,806 B2 | 5/2013 | Kim |
| 8,555,185 B2 | 10/2013 | Louch |
| 9,520,105 B2 | 12/2016 | Shi et al. |
| 9,743,358 B2 | 8/2017 | Ahn et al. |
| 10,231,186 B2 | 3/2019 | Ahn et al. |
| 10,631,247 B2 | 4/2020 | Ahn et al. |
| 10,959,179 B2 | 3/2021 | Ahn et al. |
| 2003/0162570 A1 | 8/2003 | Suzuki et al. |
| 2006/0087502 A1 | 4/2006 | Karidis et al. |
| 2006/0132474 A1 | 6/2006 | Lam |
| 2006/0227122 A1 | 10/2006 | Proctor |
| 2007/0046618 A1 | 3/2007 | Imai et al. |
| 2007/0188468 A1 | 8/2007 | Lee et al. |
| 2008/0153452 A1* | 6/2008 | Huang ............... H04W 52/027 455/403 |
| 2009/0006991 A1 | 1/2009 | Lindberg et al. |
| 2009/0119527 A1 | 5/2009 | Kim |
| 2010/0110310 A1 | 5/2010 | Ahn et al. |
| 2010/0167792 A1 | 7/2010 | Chen et al. |
| 2010/0214278 A1* | 8/2010 | Miura ................... G06F 3/048 345/212 |
| 2010/0275047 A1 | 10/2010 | Kaneko et al. |
| 2010/0289722 A1* | 11/2010 | Kitazawa ............ G09G 3/3611 455/566 |
| 2011/0009172 A1 | 1/2011 | Song et al. |
| 2011/0053650 A1 | 3/2011 | Chung |
| 2011/0225549 A1 | 9/2011 | Kim |
| 2011/0252378 A1 | 10/2011 | Anzures et al. |

OTHER PUBLICATIONS

Ahn et al., U.S. Appl. No. 15/642,057, filed Jul. 5, 2017; now U.S. Pat. No. 10,231,186.

Ahn et al., U.S. Appl. No. 16/298,371, filed Mar. 11, 2019, now U.S. Pat. No. 10,631,247.

Ahn et al., U.S. Appl. No. 16/849,625, filed Apr. 15, 2019, now U.S. Pat. No. 10,959,179.

Ahn et al., U.S. Appl. No. 17/105,379, filed Nov. 25, 2020.

* cited by examiner

METHOD AND APPARATUS FOR REDUCING POWER CONSUMPTION IN MOBILE DEVICE

CROSS-REFERENCE TO RELATED APPLICATIONS

This application is a continuation of U.S. application Ser. No. 17/105,379, filed Nov. 25, 2020, which is a continuation of U.S. application Ser. No. 16/849,625, filed on Apr. 15, 2020, now U.S. Pat. No. 10,959,179, which is a continuation of U.S. application Ser. No. 16/298,371, filed on Mar. 11, 2019, now U.S. Pat. No. 10,631,247, which is a continuation of U.S. application Ser. No. 15/642,057, filed on Jul. 5, 2017, now U.S. Pat. No. 10,231,186, which is a continuation of U.S. application Ser. No. 13/247,278, filed on Sep. 28, 2011, now U.S. Pat. No. 9,743,358, which claims priority to Korean Patent Application No. 10-2010-0094432, filed Sep. 29, 2010. The contents of each of these applications are incorporated herein in their entirety.

BACKGROUND

1. Technical Field

The present invention relates to a method and an apparatus for reducing power consumption in a mobile device. More particularly, the present invention relates to a method for minimizing unnecessary power consumption and misuse of a resource when a mobile device is changed from a sleep state to a wake-up state, and a mobile device supporting the same.

2. Description of Related Art

In recent years, with significant development of information technology, communication technology, and semiconductor technology, supply and use of all types of portable terminals have rapidly increased. Recent portable terminals provide traditional voice services as well as additional services. In addition to voice services, recent mobile communication terminals may provide various functions, such as a TV watching function (e.g., mobile broadcasting such as Digital Multimedia Broadcasting (DMB) or Digital Video Broadcasting (DVB)), a music playing function, a photographing function, and an Internet access function.

Mobile device generally use battery power, which is limited according to the battery capacity. A battery used in the mobile device supplies power for an operation of the mobile device. If the remaining capacity of the battery power is reduced lower than a predetermined level, additional supply of power stops to protect the mobile device.

However, as recent mobile devices have an advantage of mobility, power conservation of the mobile device has become an important consideration. A continuous operation of a display unit of the mobile device causes increase in power consumption. Therefore, there is a need for technologies capable of improving power consumption according to the operation of the display unit.

SUMMARY

Aspects of the present invention are to address at least the above-mentioned problems and/or disadvantages and to provide at least the advantages described below. Accordingly, an aspect of the present invention is to provide a method capable of minimizing power consumption to increase the duration of a battery in the mobile device.

Another aspect of the present invention is to provide a method for reducing power consumption of a mobile device capable of reducing power consumption according to driving of a display unit and a system through an operation of a system due to a power saving mode when the mobile device is changed from a sleep state to a wake-up state, and an apparatus thereof.

Another aspect of the present invention is to provide a method for implementing a small operation region by partially turning-on/off of a display unit, reducing unnecessary power consumption and a resource by stand-by of a system function to the minimum according to a user setting menu when a mobile device is changed from a sleep state to a wake-up state, thereby minimizing power consumption of a mobile device, and an apparatus thereof.

Another aspect of the present invention is to improve utilization and convenience of a mobile device by implementing an optimal environment for power consumption by diving of a system to the minimum when the mobile device is changed to a wake-up state.

In accordance with an aspect of the present invention, a method for reducing power consumption in a mobile device is provided. The method includes detecting a change of the mobile device from a sleep state to a wake-up state, partially turning-on a display unit of the mobile device such that a first section of the display unit displays an operating region, the first section comprising one or more portions of the display unit and less than an entire screen of the display unit, and waiting for a system function registered in the operating region.

In accordance with another aspect of the present invention, a method for reducing power consumption in a mobile device is provided. The method includes detecting an interaction for a change from a sleep state of the mobile terminal to the wake-up state, determining whether the interaction is a wake-up change interaction according to a power saving mode or a general mode when the interaction is detected, turning on an entire screen of a display unit to display an operating region based on a general mode when the corresponding interaction is wake-up change interaction according to the general mode, turning on only a first section of the display unit to display an operating region based on a power saving mode when the corresponding interaction is wake-up change interaction according to the power saving mode, the first section comprising one or more portions of the display unit and less than an entire screen of the display unit, and waiting for a system function registered in an operating region based on the power saving mode.

In accordance with another aspect of the present invention, a recording medium readable by a computer in which a program which enables to execute the method in a processor is provided.

In accordance with another aspect of the present invention, an apparatus for reducing power consumption in a mobile device is provided. The apparatus includes a display unit for displaying a first section of the display unit when the mobile device is changed from a sleep state to a wake-up state according to a power saving mode, the first section comprising one or more portions of the display unit and less than an entire screen of the display unit and a controller for turning on a first section of the display unit when an interaction for wake-up state change is detected, and for waiting for only a partial preset system function to control wake-up state change based on a power saving mode.

In accordance with another aspect of the present invention, a method of reducing power consumption in a mobile device is provided. The method includes determining whether an input for changing from a sleep state to a wake-up state is received, when the mobile device is operating in a power saving mode, turning on only a first section of a display unit of the mobile device, and displaying a predetermined user interface in the first section, while not turning on a remaining section of the display unit, and when the mobile device is not operating in the power saving mode, turning on the entire display unit of the mobile device, and displaying a predetermined user interface on a screen of the display unit, wherein the first section includes one or more portions of the display unit and less than an entire screen of the display unit, and the remaining section includes any portions of the display unit that are not part of the first section.

As illustrated above, in a method and an apparatus for reducing power consumption of a mobile device, when the mobile device is changed from a sleep state to a wake-up state, the mobile device may drive only a small operation region by turning-on/off a part of a display unit. Further, the mobile device may change only a predetermined system function to a stand-by state according to a user setting menu when the mobile device is changed to a wake-up state. When a mobile device changes to a wake-up state, power consumption according to an operation of a display unit may be reduced, and unnecessary resource and power consumption according to driving of the system may be reduced. As a result, power consumption and resource consumption generated when the mobile device is changed from a sleep state to a wake-up state may be minimized.

In accordance with an aspect of the present invention, a display unit is turned-off and a function of a system may be changed from a sleep state being a non-driving state to an on-state of the display unit to minimize power consumption generated when a set function of the system is changed to a driven wake state.

In accordance with an aspect of the present invention, when the mobile device is changed from the sleep state to a wake-up state, the display unit may be partially turned-on/off to separately drive a non-operating region and an operating region. When the mobile device is changed to the wake-up state, the mobile device may be changed to a stand-by state for only a defined certain system function (e.g., function corresponding to at least one item displayed on the operating region according to a user setting menu).

Accordingly, when a mobile device wakes-up, an unnecessary resource generated according to entering on of a display unit and a stand-by state of a system may be reduced. As a result, an optimal environment may be implemented that is capable of minimizing power consumption of a mobile device. Therefore power consumption of a mobile device may be minimized, thereby improving utilization, convenience, and competitive force of the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXAMPLE EMBODIMENTS

Figure 1:
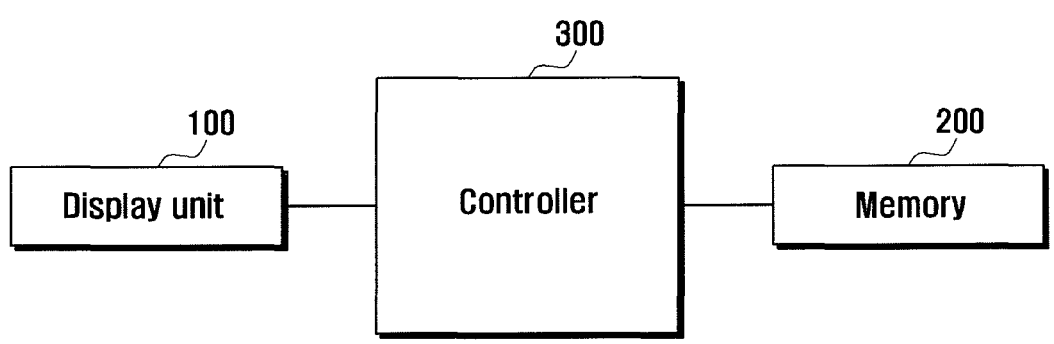
FIG. 1 is a block diagram illustrating a configuration of a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method capable of minimizing unnecessary power consumption when operating a display unit of a mobile device, and an apparatus supporting the same. Exemplary embodiments of the present invention may minimize power consumption when a mobile device is changed from a sleep state to a wake-up state. When the mobile device is changed from a sleep state to a wake-up state, the mobile device may partially turn-on/off a display unit to separately display a non-operating region and an operating region. When the mobile device is changed to the wake-up state, a previously defined function (e.g., a function corresponding to at least one item allotted to the operating region according to a user setting menu) enters a stand-by state. Accordingly, the mobile device may partially turn on a display unit and enter a partial stand-by state of a system function when the mobile device wakes up to reduce unnecessary power consumption. The sleep state denotes a non-driving state in which a display unit of a mobile device is turned-off and system functions are not operated. The wake-up state denotes a state in which the display unit is changed to an on state to drive at least one set system function.

A mobile device and an operation control method thereof according to an exemplary embodiment of the present invention are described below with reference to accompanying drawings. However, a configuration of a mobile device and an operation control method thereof are not limited to following exemplary embodiments, and it should be clearly understood that the present invention is applicable to various exemplary embodiments.

FIG. 1 is a block diagram illustrating a configuration of a mobile device according to an exemplary embodiment of the present invention.

Referring to FIG. 1, the mobile device includes a display unit 100, a memory 200, and a controller 300. The mobile device may also includes additional units, such as a Radio Frequency (RF) unit performing a communication function, an audio processing unit including a microphone and a speaker, a digital broadcasting module performing reception and playback of digital broadcasting (e.g., mobile broadcasting such as Digital Multimedia Broadcasting (DMB) Digital Video Broadcasting (DVB)), a camera module, a BLUETOOTH communication module performing a BLUETOOTH communication function, an Internet communication module performing an Internet communication function, a touch pad for touch based input, an input unit supporting physical key input, and a battery supplying power to the structural elements of the mobile device.

The display unit 100 provides an execution screen of applications supported by the mobile device as well as a home screen of the mobile device. For example, the display unit 100 may provide execution screens for a message function, an electronic mail function, an Internet function, a multi-media function, a search function, a communication function, an electronic book (e.g., e-book), camera functions, photograph/moving image playing functions, a TV playback function (e.g., playback function of mobile broadcasting such as DMB or DVB), a music playback function, a widget function, a memo function, and a game function.

The display unit 100 may be Liquid Crystal Display (LCD). However, other display devices may also be used, such as a Light Emitting Diode (LED), an Organic LED (OLED), or an Active Matrix OLED) (AMOLED). When displaying the execution screen, the display unit 100 may provide a horizontal mode or a vertical mode according to an orientation of the mobile device.

The display unit 100 may include an interface supporting touch based input. For example, the display unit 100 may support touch based user interaction input by a touch-screen configuration, and generate and transfer an input signal according to the user interaction input to the controller 300.

The display unit 100 may separately provide an operating region and a non-operating region by partially turning on or off sections of the display unit 100 when the mobile device is changed from a sleep state to a wake-up state. The display unit 100 may turn-on some sections of a screen and turn off remaining sections when the mobile device is changed to a wake-up state according to a power saving mode. The display unit 100 may display at least one item corresponding to a user setting menu on an operating region when the display unit 100 is partially turned on. An operation method according to partial on/off of the display unit 100 is described below.

The memory 200 stores various programs and data executed and processed by the mobile device. The memory 200 may be configured by at least one volatile memory device and non-volatile memory device. For example, the memory 200 may continuously or temporarily store an operating system of the mobile device, programs and data associated with a display control operation of the display unit 100, programs and data associated with an input control operation using the display unit 100, programs and data associated with an operation changed to a wake-up state when interaction is detected in a sleep state of the mobile device, programs and data associated with an operation of the display unit 100 when the mobile device is changed from the sleep state to a wake-up state, and programs and data associated with a stand-by state operation with respect to functions set when the mobile device is changed from the sleep state to the wake-up state.

The memory 200 may store setting information for operation schemes for reducing power consumption of the mobile device. For example, the memory 200 may store setting information according to activation and deactivation of a power saving mode, setting information with respect to items displayed on an operating region in the power saving mode, setting information about a type of interaction for the power saving mode, and setting information with respect to a location of an operating region displayed on the display unit 100 in the power saving mode.

The controller 300 controls overall operations of the mobile device. The controller 300 may control an operation associated with a power saving mode operation for reducing power consumption. For example, the controller 300 may detect interaction in which the display unit 100 is turned on in a sleep state of the mobile device. When interaction according to turning on of the display unit 100 is detected, the controller 300 changes the mobile device from a sleep state to a wake-up state. When the mobile device is changed to the wake-up state, the controller 300 controls partial on/off of the display unit 100 according to a power saving mode to separately display a non-operating region and an operating region. Further, the controller 300 controls the display of items corresponding to a previously registered user menu in the operating region. The controller 300 controls a stand-by state for executing a function with respect to only predetermined functions corresponding to a menu item of the items.

A control operation of the controller 300 is described below with respect to a control method. The controller 300 may also perform various control operations associated with a general function of the mobile device. When executing an application, the controller 300 may control an operation of the mobile device and data display. Further, the controller 300 may receive an input signal corresponding to various input schemes supported from a touch based input interface and control a function operation according thereto. The controller 300 may control an operation in a power saving mode with respect to predetermined system functions registered in an operating region after driving a system according to a power saving mode. The controller 300 may change a mode to a general mode according to input interaction after driving a system in a power saving mode and control a system operation according thereto.

The mobile device may be configured as a bar type, a folder type, a slide type, a swing type, and a flip type. The mobile device may be any of a variety of information communication devices, multi-media devices, and application devices with respect thereto. For example, the mobile device may be a Personal Computer (PC), a smart phone, a Portable Multimedia Player (PMP), a digital broadcasting player, a Personal Digital Assistant (PDA), a music player, a portable game terminal, a notebook computer, a netbook computer as well as a mobile communication terminal operated based on respective communication protocols corresponding to various communication systems.

Figure 2:
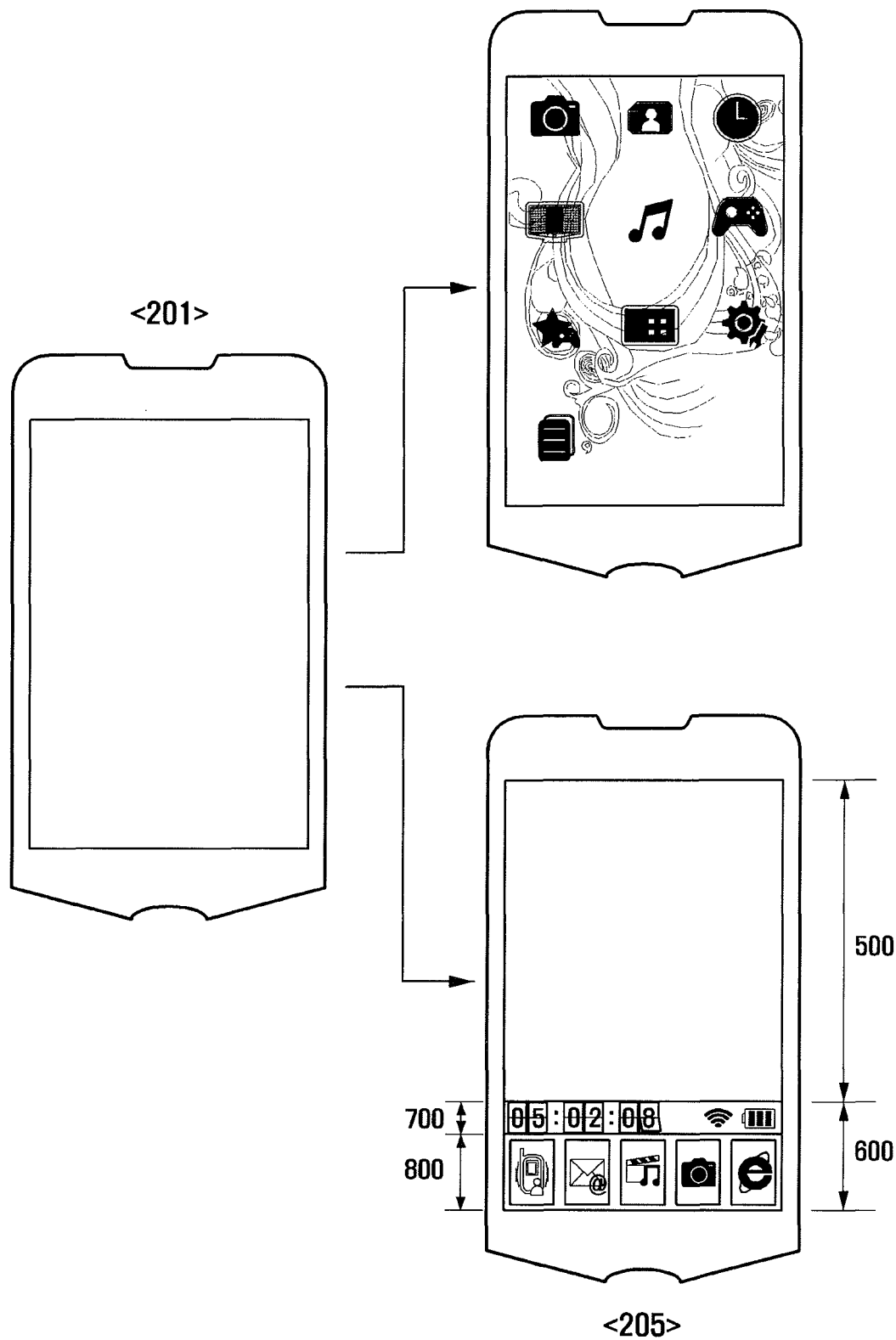
FIG. 2 is a view illustrating an operation of a mobile device when the mobile device is changed to a wake-up state according to an exemplary embodiment of the present invention.

FIG. 2 is a view illustrating an operation of a mobile device when it is changed to a wake-up state according to an exemplary embodiment of the present invention.

Referring to FIG. 2, in state 201, the mobile device is in a sleep state and the display unit 100 is turned off. The mobile device may be changed from a sleep state to a wake-up state according to external interaction, and the display unit 100 may be turned on. For example, the controller 300 may control change of the mobile device from the sleep state to a wake-up state according to user input based interaction and turning-on of the display unit 100. The controller 300 may control change of the mobile device from a sleep state to a wake-up state according to communication event based interaction received from an exterior and turning-on of the display unit 100.

If external interaction is input as illustrated above, a display unit 100 is turned-on corresponding to change of a wake-up state in state 205, and a corresponding screen (e.g., a home screen or a power saving home screen) may be displayed. For example, the controller 300 may identify a setting state of a power saving mode when the mobile device is changed from a state of reference numeral 201 to a wake-up state corresponding to external interaction. The controller 300 may determine whether a power saving mode is activated or deactivated.

If the power saving mode is deactivated, the controller 300 may control wake-up state change according to a general mode. For example, the controller 300 may display a home screen with the entire screen of the display unit 100 in state 203. The controller 300 turns on the entire display unit 100 and uses the entire screen as an operating region. The controller 300 controls entering a stand-by state with all appropriate system functions operating in the mobile device.

When the power saving mode is activated, the controller 300 may control wake-up state change according to the power saving mode. For example, the controller 300 may display a power saving home screen as a partial screen of the display unit 100 in state 205. The controller 300 uses a partial section of the display unit 100 as the operating region 600, and remaining sections as the non-operating region 500. The controller 300 controls stand-by entry with respect to predetermined system functions allotted to a power saving home screen of the operating region 600 among all system functions operated by the mobile device.

In state 205, when the mobile device is changed to a wake-up state according to a power saving mode, the display unit 100 may turn on a section (or portion) of the display unit 100 and maintain the remaining sections (or portions) in an off state. Accordingly, the display unit 100 may display a region in an off state as the non-operating region 500 and a region in an on state as the operating region 600.

The operating region 600 may be divided into a state information region 700 and a menu region 800. The state information region 700 is a region indicating state information of a mobile device. Predetermined preset state information items such as weather, time, and a residual amount of a battery may be provided to the state information region 700. The menu region 800 is a region indicating menu items of a predetermined number of functions, such as a user setting menu, among system functions operated in the mobile device. The menu item indicates the operating region 600 (in particular, displayed on the menu region 800) according to the user setting menu. The menu item indicates an item for executing a corresponding mapped function. The state information region 700 or the menu region 800 may be selectively omitted according to user setting.

FIG. 2 illustrates partial on/off of the display unit 100 according to a power saving mode set in a method for reducing power consumption according to an exemplary embodiment of the present invention, and accordingly to support driving of a system due to stand-by of functions registered in the operating region 600. However, the mobile device may change to a wake-up state according to a power saving mode in an interaction input scheme of a user using the mobile device regardless of a state of the power saving mode.

For example, one function a mobile device may be designated as a function key (referred to as 'power saving mode' hereinafter). A wake-up state change according to a general mode with respect to interaction other than a power saving mode key may be employed. The wake-up state change according to a power saving mode with respect to interaction based on power saving key may be employed. One function key (e.g., hot key) may be designated as a key for an operation of an exemplary embodiment of the present invention. Wake-up state change due to a general mode and a power saving mode may be supported according to an input scheme (e.g., a short press or a long press) of the certain function key.

When interaction for changing the mobile device from a sleep state to a wake-up state is input, wake up state change due to a power saving mode may be supported according to an activation setting state of the power saving mode. When interaction for changing the mobile device from a sleep state to a wake-up state is input, the wake-up state change in a power saving mode may occur according to whether a corresponding interaction is a wake-up change interaction (e.g., an interaction according to a power saving mode key or an interaction according to a hot key short press) in a power saving mode or a wake-up change interaction in a general mode.

The mobile device may identify an activation setting state of a power saving mode when interaction for changing a mobile device from a sleep state to a wake-up state is input The mobile device may support wake-up state change in a power saving mode according to whether the interaction is a wake up change interaction in a power saving mode or a wake up change interaction in a general mode when the power saving mode is activated.

The user may use a certain function or check certain contents more frequently than other functions when waking-up a mobile device. For example, the user may wake up the mobile device to check the time or to check E-mail or other messages. In a mobile device of the related art, the entire display unit 100 is operated as an operating region, and unnecessary functions enter a stand-by state to cause power consumption and use of an unnecessary resource.

According to an exemplary embodiment of the present invention, the mobile device supports wake-up state change according to a power saving mode. Accordingly, the mobile device may operate only a part (e.g., ¼) of the display unit 100 as the operating region 600 to reduce power consumption. The mobile device may enter only preset functions in the operating region 600 to prevent an unnecessary resource from being used and to improve initializing operation speed.

Figure 3:
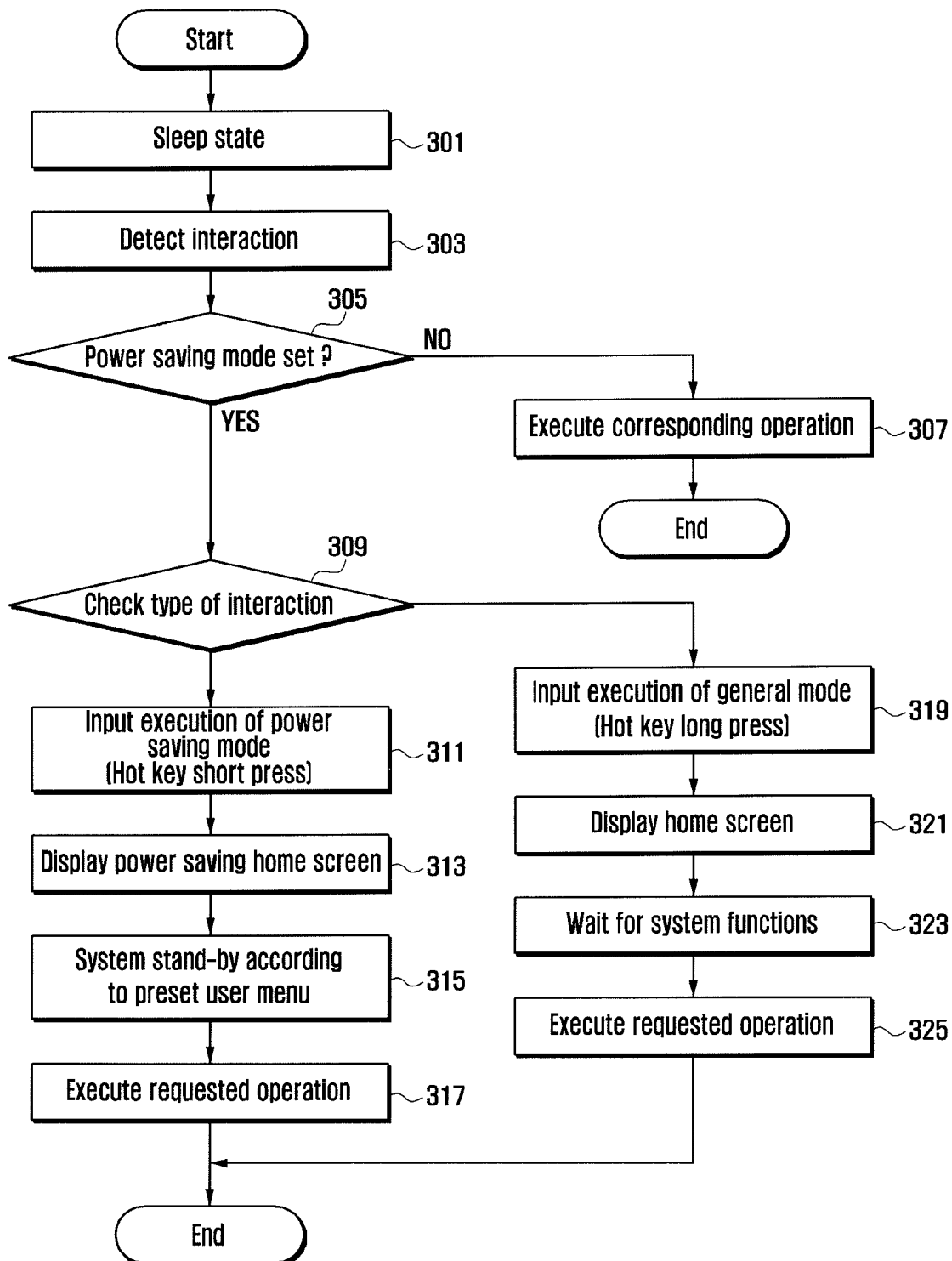
FIG. 3 is a flowchart illustrating a control operation of a mobile device for reducing power consumption when the mobile device wakes up according to an exemplary embodiment of the present invention.

FIG. 3 is a flowchart illustrating a control operation of a mobile device for reducing power consumption when the mobile device wakes up according to an exemplary embodiment of the present invention.

Referring to FIG. 3, the mobile device enters a sleep state in step 301. In step 303, the controller 300 detects an interaction requesting change of a mobile device from the sleep state to a wake-up state. For example, the controller 300 may detect the interaction based on user input or a communication event in a sleep state where a display unit 100 is turned off and functions of a system are not operated.

The controller 300 determines whether a power saving mode is set when the interaction is detected in a sleep state in step 305. For example, the controller 300 may determine whether the power saving mode is activated or deactivated.

If the power saving mode is deactivated (NO of step 305), the controller 300 may control execution of a corresponding operation in step 307. For example, as illustrated in step 319 to step 325, the controller 300 may control an operation of the display unit 100 according to a general mode and a booting procedure of a system.

If the power saving mode is activated (YES of step 305), the controller 300 may identify a type of input interaction in step 309. For example, the controller 300 may determine whether the input interaction is for wake-up state change according to the power saving mode (power saving interaction) in step 311 or for wake-up state change according to a general mode (general mode interaction) in step 319. In FIG. 3, the power saving interaction and the general mode interaction may be set according to an input time of a certain function key (e.g., hot key). For example, the controller 300 may determine that the power saving mode interaction refers to a case where a hot key is held down (or continuously input) for less than a preset threshold time (hot key short press) in step 311. The controller 300 may determine that the general mode interaction refers to a case where a hot key is held down (or continuously input) for longer than a preset threshold time (hot key long press) in step 319.

The power saving mode interaction and the general mode interaction may be distinguished from each other according to whether a previously allotted certain function key (e.g., power saving mode key) is input as illustrated in FIG. 2. For example, interaction due to a power saving mode key may be determined as power saving mode interaction. Interaction by a key other than the power saving mode key or interaction by reception of a communication event may be determined as general mode interaction. In addition, the power saving mode interaction and the general mode interaction may be set by communication events. The power saving mode interaction and the general mode interaction may be set as interaction based on user input and interaction based on a communication event, respectively. When the power saving mode is set to an active state as illustrated earlier, step 309, step 319 to step 325 may be omitted. When the mobile terminal is operated by separation of the interaction regardless of a setting state of a power saving mode, step 305 and step 307 may be omitted.

If the interaction is the power saving mode interaction in step 311, the controller 300 controls display of a power saving home screen in step 313. For example, the controller 300 may display a part of entire sections as an operating region 600 and remaining sections as a non-operating region 500 though partial on/off of the display unit 100 as illustrated in state 205 in FIG. 2. The controller 300 may display predetermined defined items on the operating region 600.

When the power saving home screen is displayed, the controller 300 waits for only a system function according to a user menu set in the operating region 600 in step 315. For example, as illustrated above, the controller 300 controls stand-by states only for functions corresponding to menu items registered in the operating region 600 among functions supported from a mobile device as illustrated previously.

The controller 300 may control execution of a requested operation in step 317. For example, the controller 300 may control execution based on a menu item given through a power saving home screen after wake-up state change based on a power saving mode and display of an execution screen thereof through a foregoing procedure. The controller 300 may control change from a power saving home screen according to a power saving mode to a home screen according to a general mode according to user interaction.

If the interaction is general mode interaction in step 319, the controller 300 may control display of a home screen in step 321. For example, the controller 300 may display a home screen by using the entire screen of the display unit 100 as the operating region as illustrated in state 203 of FIG. 2.

When the home screen is displayed, the controller 300 waits for all system functions supported from the mobile device in step 323. The controller 300 may control execution of a requested operation in step 325. For example, the controller 300 may control execution based on a menu item given through a home screen after wake-up state change based on a general mode and display of an execution screen thereof through a foregoing procedure. The controller 300 may control change from a home screen according to a general mode to a power saving home screen according to a power saving mode according to user interaction.

A saving mode operation for reducing power consumption according to an exemplary embodiment of the present invention may be implemented in an executable program command form by various computer means and be recorded in a non-transitory computer readable recording medium. In this case, the non-transitory computer readable recording medium may include a program command, a data file, and a data structure individually or a combination thereof. The program command recorded in a recording medium may be specially designed or configured for the present invention or be known to a person having ordinary skill in a computer software field to be used. The computer readable recording medium includes magnetic media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, Random Access Memory (RAM), flash memory storing and executing program commands. Further, the program command includes a machine language code created by a complier and a high-level language code executable by a computer using an interpreter. The foregoing hardware device may be configured to be operated as at least one software module to perform an operation of exemplary embodiments of the present invention, and a reverse operation thereof is the same. While it is understood that some of the operations of the mobile device may be implemented in software, it would also be understood that at least some operations or units of the mobile device would need to be implemented in hardware in order to carry out their function.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. An electronic device comprising:
a display comprising a touch screen; and
a processor configured to control the display to display an execution screen for an operation executed by the processor, wherein the processor is configured to:

control to drive the display so that the execution screen is displayed on substantially an entirety of the display;
control to receive a first user interaction through the touch screen, while the execution screen is displayed on substantially the entirety of the display;
based on the first user interaction, control to drive the display so that the execution screen is displayed on only a viewable partial region of the display less than substantially the entirety of the display and is not displayable on a viewable remaining region of the display other than the viewable partial region;
control to receive a second user interaction through the touch screen, while the execution screen is displayed on only the partial region of the display and is not displayable on the viewable remaining region of the display; and
based on the second user interaction, control changing from driving the display so that the execution screen is displayed on only the viewable partial region of the display less than substantially the entirety of the display and is not displayable on the viewable remaining region of the display to driving the display so that the execution screen is displayed on substantially the entirety of the display,
wherein power consumption of the display is reduced when the driving of the display is changed from driving the display so that the execution screen is displayed on substantially the entirety of the display to driving the display so that the execution screen is displayed on only the partial region of the display and is not displayable on the viewable remaining region of the display.

2. The electronic device according to claim 1, wherein at least one of the first user interaction or the second user interaction comprises a touch input to the touch screen.

3. The electronic device according to claim 1, further comprising a communication module.

4. The electronic device according to claim 1, wherein the electronic device comprises a mobile phone.

5. A method for an electronic device, the method comprising:
driving a display of the electronic device comprising a touchscreen to display an execution screen for an operation executed by the electronic device on substantially an entirety of the display;
receiving a first user interaction through the touchscreen, while the execution screen is displayed on substantially the entirety of the display;
based on the first user interaction, driving the display so that the execution screen is displayed only on a viewable partial region of the display less than substantially the entirety of the display and is not displayable on a viewable remaining region of the display other than the viewable partial region;
receiving a second user interaction through the touch screen, while the execution screen is displayed on only the partial region of the display and is not displayable on the viewable remaining region of the display;
based on the second user interaction, changing from driving the display so that the execution screen is displayed on only the viewable partial region of the display less than substantially the entirety of the display and is not displayable on the viewable remaining portion of the display to driving the display so that the execution screen is displayed on substantially the entirety of the display,
wherein power consumption of the display is reduced when the driving of the display changes from driving the display so that the execution screen is displayed on substantially the entirety of the display to driving the display so that the execution screen is displayed on only the partial region of the display and is not displayable on the viewable remaining region of the display.

6. The method according to claim 5, wherein at least one of the first user interaction or the second user interaction comprises a touch input to the touch screen.

7. A non-transitory computer readable medium storing a program which, when executed by a processor of an electronic device, causes the processor to control to:
drive a display of the electronic device comprising a touchscreen to display an execution screen for an operation executed by the electronic device on substantially an entirety of the display;
receive a first user interaction through the touchscreen while the execution screen is displayed on substantially the entirety of the display;
based on the first user interaction, drive the display so that the execution screen is displayed only in a viewable partial region of the display less than substantially the entirety of the display and is not displayable in a viewable remaining region of the display other than the viewable partial region;
receive a second user interaction through the touch screen while the execution screen is displayed in only the partial region of the display and is not displayable in the viewable remaining region of the display;
based on the second user interaction, change from driving the display so that the execution screen is displayed in only the viewable partial region of the display less than substantially the entirety of the display and is not displayable in the viewable remaining portion of the display to driving the display so that the execution screen is displayed on substantially the entirety of the display,
wherein power consumption of the display is reduced when the driving of the display changes from driving the display so that the execution screen is displayed on substantially the entirety of the display to driving the display so that the execution screen is displayed in only the partial region of the display and is not displayable in the viewable remaining region of the display.

8. An electronic device comprising the non-transitory computer-readable medium according to claim 7.

9. A mobile phone comprising the non-transitory computer-readable medium according to claim 7.

10. An electronic device comprising:
a display comprising a touch screen; and
a processor configured to:
control to drive the display to use, as an operating region of the display, substantially an entirety of the display;
control to receive a first user interaction through the touch screen, while substantially the entirety of the display is used as the operating region;
based on the first user interaction, control to drive the display to change from using substantially the entirety of the display as the operating region to using, as the operating region, a viewable partial region of the display less than substantially the entirety of the display and, as a non-operating region of the display, a viewable remaining region of the display other than the partial region;

control to receive a second user interaction through the touch screen while the viewable partial region of the display is used as the operating region and the viewable remaining region of the display is the non-operating region; and based on the second user interaction, control to drive the display to change from using the viewable partial region of the display as the operating region and the viewable remaining region of the display as the non-operating region to using substantially the entirety of the display as the operating region, wherein an execution screen is disposed only in the viewable operating region of the display, and not in the viewable non-operating region of the display, when the display uses the viewable partial region of the display as the operating region, and wherein the viewable non-operating region of the display enables reduced-power consumption of the display.

\* \* \* \* \*